Patented June 6, 1933

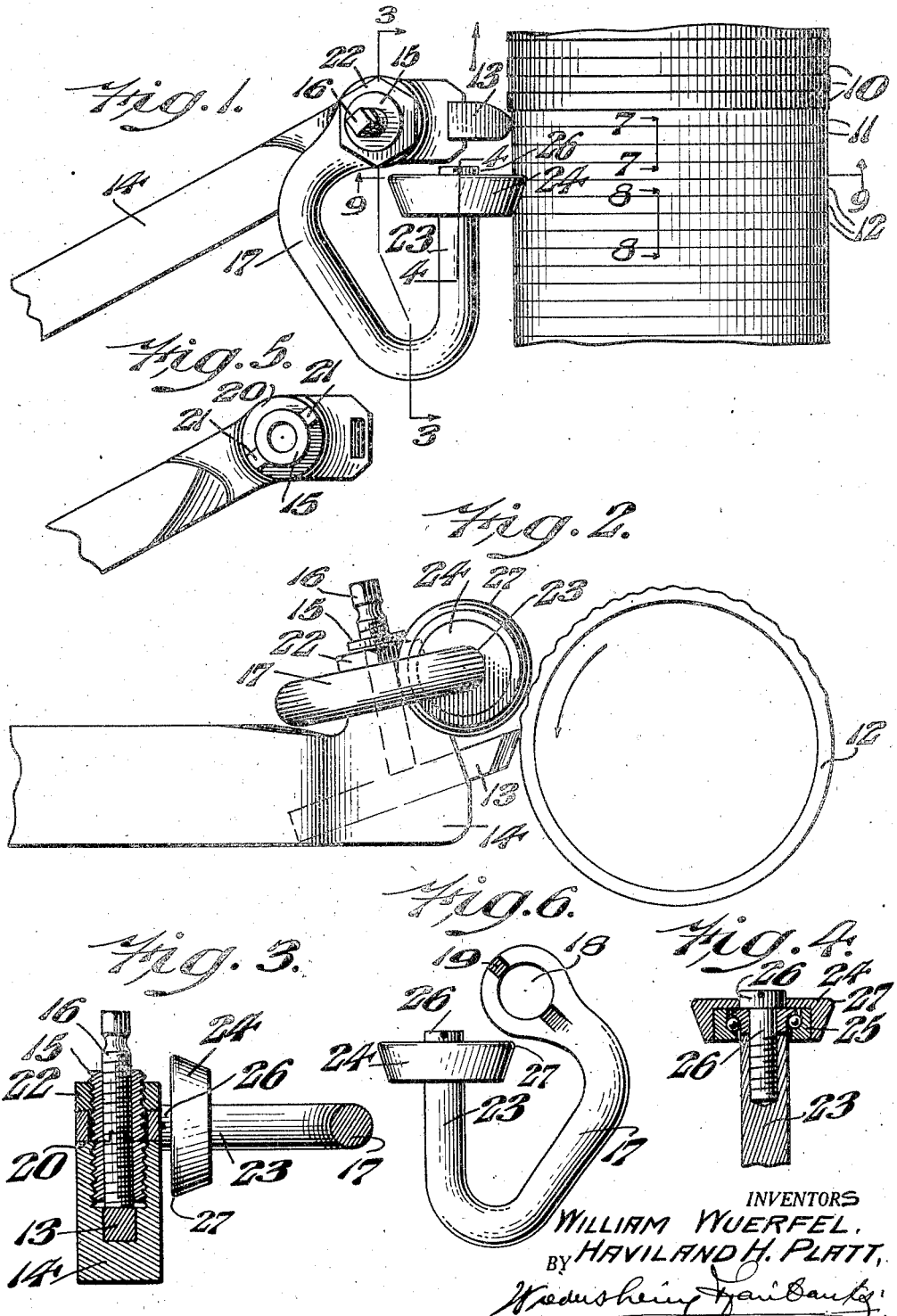

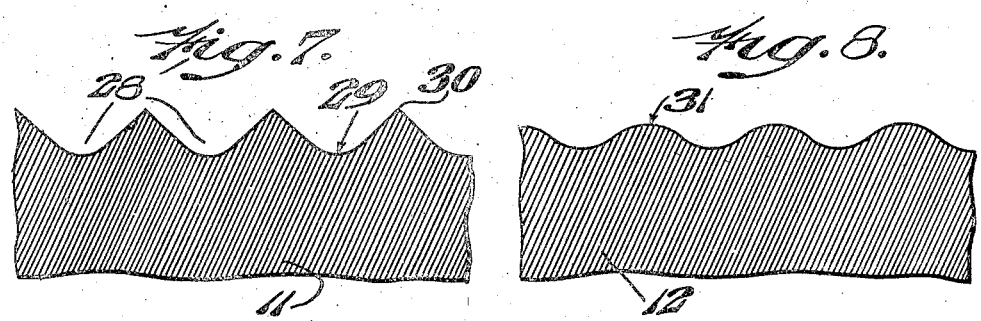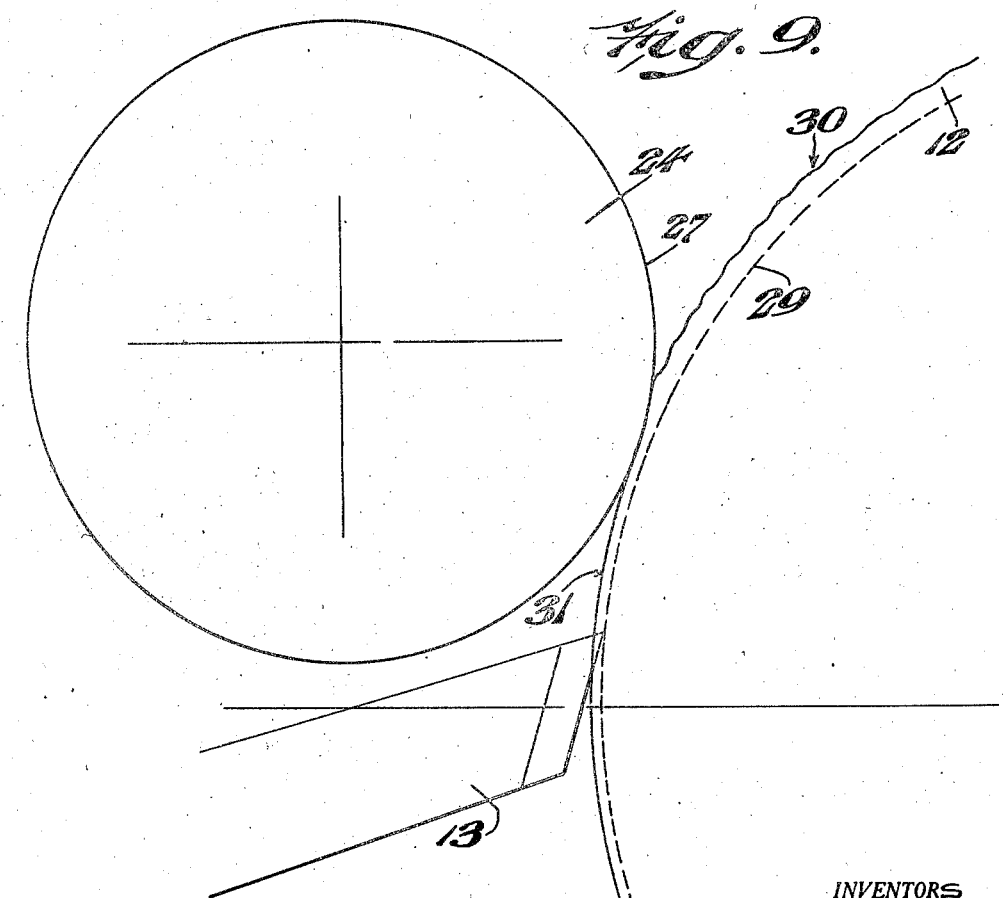

1,913,136

UNITED STATES PATENT OFFICE

WILLIAM WUERFEL, OF PHILADELPHIA, AND HAVILAND H. PLATT, OF WALLINGFORD, PENNSYLVANIA, ASSIGNORS TO WILKENING MANUFACTURING COMPANY, OF PHILADELPHIA, PENNSYLVANIA, A CORPORATION OF DELAWARE

QUICK-SEATING PISTON RING AND METHOD OF MAKING THE SAME

Application filed August 6, 1928. Serial No. 297,872.

Our invention relates to a new and useful method of finishing metallic surfaces and it relates more particularly to a novel method of finishing the peripheral or cylindrical contact surfaces of piston rings and the like.

It is the aim in making piston rings, particularly for internal combustion engines, to provide a cylindrical outer surface which will present a true and continuous circular contact against the cylinder wall, and which will, moreover, be capable of seating rapidly.

It has been the practice heretofore to turn the outer cylindrical surfaces of piston rings upon a lathe with a relatively coarse turned finish so as to produce upon such surface a slight, though appreciable, spiral groove. When piston rings of this type are installed, the initial contact is between a comparatively fine circular or spiral line at the top of the groove, which wears off comparatively quickly as the ring is seated against the inner surface of the cylinder.

In producing this comparatively coarse and quickly seating finish upon piston rings, there is always an attendant disadvantage, in that the coarse turned finish does not present a true or smooth circular contact edge initially, because the top of the spiral groove is jagged or finely serrated, and it has been found in practice that while the coarse-finish-turned rings seat comparatively quickly, they form a very inefficient seal while seating; or prior to complete seating of the piston ring it is incapable of any considerable compression due to the serrated and hence discontinuous contacting edges on the outer periphery of the ring.

It is the object of our invention to produce a piston ring of the coarsely finished type, that is, a ring having a coarsely turned outer surface but which will present continuous circular contacting edges when first installed, thereby forming a high pressure seal initially as well as after the ring has seated.

Thus, according to our invention, the outer surfaces of piston rings are turned in the usual manner, mounted upon a suitable mandrel in a lathe, and subsequent to the final turning, the turned surface is subjected to the action of a roller, in such a manner as to roll the tops or apices of the grooves into smooth and continuous contact edges.

Our invention also relates to a novel tool for carrying out our novel method.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the accompanying drawings in which like reference characters indicate like parts:

Figure 1 represents a top plan view of piston rings mounted for turning in a lathe and the tool of our novel construction shown in operative relation thereto.

Figure 2 represents a side elevation of the same.

Figure 3 represents a section on line 3—3 of Figure 1.

Figure 4 represents a section on line 4—4 of Figure 1.

Figure 5 represents a top plan view of the tool holder, with a roller arm removed.

Figure 6 represents a top plan view of the roller arm and roller.

Figure 7 represents a diagrammatic, fragmentary, longitudinal section on line 7—7 of Figure 1, on a greatly enlarged scale, showing the general character of the coarse turned piston ring surface prior to the rolling operation.

Figure 8 represents a similar fragmentary, diagrammatic sectional view on line 8—8 of Figure 1, on a greatly enlarged scale, illustrating the general character of the turned piston ring surface after the rolling operation.

Figure 9 represents a similar diagrammatic sectional view on line 9—9 of Figure 1, illustrating the serrated character of the peak of the turned groove prior to rolling, and the smooth and continuous character of the same subsequent to rolling.

In carrying out our novel method, the rings may be finished inside and on their two parallel faces or side edges in the usual manner, and may be also split and rough turned on the outside. The rings are then mounted and clamped upon a suitable mandrel and mounted between centers on a suitable lathe, as shown schematically in Figure 1.

Thus in Figure 1, 10 designates the rings prior to final turning while the finally turned rings are designated by the numeral 11 and the turned and rolled rings by the numeral 12.

The turning tool may be of any suitable character, as for instance, a tool bit 13 mounted in a suitable tool holder 14 as is commonly the practice.

In the preferred embodiment of the invention, the tool holder 14 is provided with a hollow internally and externally threaded stud or post 15, through which the tool set screw 16 extends. Upon the tubular stud or post 15 a resilient or spring roller-arm 17 is mounted, as shown particularly in Figures 1, 3 and 6; the roller arm 17 being provided with a terminal eyelet 18 which fits over the stud 15. A keyway slot 19 is cut into the eyelet 18, while the upper shoulder 20 of the tool holder is provided with a fixed key 21, adapted to seat within the keyway or slots 19 in the eyelet 18 of the roller arm, thereby to retain the same against turning or deflection upon the tool holder. A nut 22 threaded onto the stud 15, clamps the roller arm 17 firmly to the tool holder.

The roller arm 17 is suitably shaped so that the free end 23 thereof will be substantially parallel to the direction of travel of the lathe carriage, and so that it will be sufficiently resilient and yielding.

Upon the free end 23 of the spring arm 17, a roller 24 is mounted in a manner shown particularly in Figure 4. Thus the roller 24 is carried upon a suitable roller bearing 25 and upon a fixed stationary screw 26 threaded into the end of the arm 23. The roller 24 is preferably of some extremely hard steel or alloy and is provided with a slightly rounded peripheral nose 27 which contacts with the work.

In setting up the machine, the tool bit 13 is set slightly further back than the roller 24 so that when the transverse carriage of the lathe is advanced towards the work the roller will contact with the work first by a suitable amount, and as the carriage is further advanced to bring the tool bit to the proper diameter of the finished ring, the roller 24 carried by the resilient spring arm 17 will be deflected back a slight extent, thereby imparting suitable pressure to the roller. The pressure on the roller may be varied by suitably adjusting the tool bit 13 with respect to the finished diameter of the piston rings and with respect to the roller 24.

Figure 7 represents a greatly magnified transverse section of a ring after it has been turned to the desired finished diameter by the tool bit 13. The turned surface thus consists of a continuous helical groove 28, the bottom 29 of which may be of any suitable shape, dependening upon the shape of the tip of the tool bit 13, while the top 30 of the groove is a comparatively fine line edge. Due to the slight vibration of the tool bit 13 and possibly also due to the extreme fineness of the edge 30, said edge does not present a smooth and continuous circle but is somewhat uniformly serrated or jagged as indicated schematically in Figures 2 and 9.

As the roller 24 passes over the groove 28, it depresses and re-shapes the top of the groove to a somewhat flattened and smooth edge 31, indicated in Figures 8 and 9.

The resultant rolled-finished surface is thus like-wise composed of a continuous helical groove, but having a smooth continuous upper edge lying generally in a circle. A piston ring thus produced will possess the inherent advantage over the rings heretofore made, in that it will not only seat quickly, but it will also form a pressure-proof seal during the time required for seating, since even the fine contact line of the groove of the coarse finished surface will form a pressure-proof seal against a cylindrical surface because the normal irregularities or serrations thereof have been removed by the rolling operation.

We are aware that our invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having thus described our invention what we claim as new and desire to secure by Letters Patent, is:—

1. The method of finishing piston rings which consists in turning the outer cylindrical surface of the piston ring with a relatively coarse cut, to a diameter slightly in excess of the desired finished diameter and producing thereby, upon said outer cylindrical surface, a slight spiral ridge having contiguous convolutions, and pressing down the top of said ridge to a suitable extent in a generally longitudinal direction with respect thereto, without however obliterating the same.

2. The method of finishing cast iron piston rings, which consists in turning the outer cylindrical surface of the piston ring with a relatively coarse cut, to the diameter slightly in excess of the desired finished diameter and producing thereby, upon said outer cylindrical surface, a slight spiral ridge having contiguous convolutions, and subsequently rolling down the top of said ridge to a suitable extent in a generally longitudinal direction with respect thereto, without however obliterating the same.

3. A quick-seating piston ring having its outer cylinder-contact surface coarsely turned with a slight spiral groove and corresponding slight spiral ridge extending over its cylinder-contact surface;—said slight spiral ridge being slightly rolled down to a suitable extent, without however being obliterated; said slightly coarse-turned and rolled-down spiral ridge being adapted to be worn down first in the initial operation of the piston ring within a cylinder, thereby more quickly to obtain a pressure-sealing fit between the cylinder wall and the piston ring, in the early life of the latter.

WILLIAM WUERFEL.
HAVILAND H. PLATT.